(12) United States Patent
Li et al.

(10) Patent No.: US 11,961,986 B2
(45) Date of Patent: Apr. 16, 2024

(54) BATTERY MODULE AND BATTERY PACK

(71) Applicants: CALB Co., Ltd., Jiangsu (CN); CALB Technology Co., Ltd., Jiangsu (CN)

(72) Inventors: Zhouli Li, Luoyang (CN); Li Niu, Luoyang (CN); Guohua Sun, Luoyang (CN); Xinjian Li, Changzhou (CN); Qixin Guo, Luoyang (CN)

(73) Assignees: CALB Co., Ltd., Jiangsu (CN); CALB Technology Co., Ltd., Jiangsu (CN)

( * ) Notice: Subject to any disclaimer, the term of this patent is extended or adjusted under 35 U.S.C. 154(b) by 287 days.

(21) Appl. No.: 17/180,846

(22) Filed: Feb. 21, 2021

(65) Prior Publication Data

US 2022/0209326 A1 Jun. 30, 2022

(30) Foreign Application Priority Data

Dec. 25, 2020 (CN) .......................... 202011563209.0

(51) Int. Cl.
*H01M 50/204* (2021.01)
*H01M 10/615* (2014.01)
(Continued)

(52) U.S. Cl.
CPC ....... *H01M 10/658* (2015.04); *H01M 10/615* (2015.04); *H01M 50/204* (2021.01); *H01M 50/289* (2021.01); *Y02E 60/10* (2013.01)

(58) Field of Classification Search
CPC ............. H01M 10/658; H01M 50/204; H01M 10/615; H01M 50/289; Y02E 60/10
See application file for complete search history.

(56) References Cited

U.S. PATENT DOCUMENTS

| 10,026,936 B2 * | 7/2018 | Park ................. H01M 10/6562 |
| 2010/0028758 A1 * | 2/2010 | Eaves ............... H01M 10/6555 |
| | | 429/50 |

(Continued)

FOREIGN PATENT DOCUMENTS

| CN | 107046115 | 8/2017 |
| CN | 107946508 | 4/2018 |

(Continued)

OTHER PUBLICATIONS

English translation of CN201721134953U as taught by Cao et al (Year: 2018).*

(Continued)

*Primary Examiner* — Amanda C. Walke
(74) *Attorney, Agent, or Firm* — JCIP GLOBAL INC.

(57) ABSTRACT

A battery module includes a battery column, a heat insulation pad and a side plate. The battery column includes a plurality of batteries, and the batteries are arranged in a first direction. The heat insulation pad is disposed between two adjacent batteries in the battery column. The side plate is disposed on a side surface of the battery column and extends in the first direction. At least one heat-resistant region is disposed on the side plate and corresponds to a position of the heat insulation pad. The heat-resistant region is any one of a through hole, a blind hole, and a notch or a combination of two or more of the foregoing communicated with each other. At least a portion of an orthographic projection of the heat insulation pad on the side plate is disposed within the heat-resistant region.

16 Claims, 9 Drawing Sheets

(51) Int. Cl.
  *H01M 10/658* (2014.01)
  *H01M 50/289* (2021.01)

(56) References Cited

U.S. PATENT DOCUMENTS

2017/0012259 A1  1/2017  Lin et al.
2020/0295321 A1  9/2020  Omura et al.

FOREIGN PATENT DOCUMENTS

| | | | | | |
|---|---|---|---|---|---|
| CN | 207368040 U | * | 5/2018 | .......... | H01M 10/613 |
| CN | 208507889 U | * | 2/2019 | | |
| CN | 109643778 | | 4/2019 | | |
| CN | 209418577 | | 9/2019 | | |
| CN | 111684618 | | 9/2020 | | |
| CN | 212136646 | | 12/2020 | | |
| EP | 3731300 | | 10/2020 | | |
| JP | 2006236827 | | 9/2006 | | |

OTHER PUBLICATIONS

English translation of CN-208507889-Uas taught by Huang et al (Year: 2019).*
"Search Report of Europe Counterpart Application", dated Aug. 4, 2021, p. 1-p. 6.
"Office Action of China Counterpart Application" with English translation thereof, dated Oct. 11, 2021, p. 1-p. 15.
Office Action of European Counterpart Application, dated Dec. 20, 2022, pp. 1-3.
"Office Action of Europe Counterpart Application", dated Nov. 3, 2023, p. 1-p. 4.

* cited by examiner

BATTERY MODULE AND BATTERY PACK

CROSS-REFERENCE TO RELATED APPLICATION

This application claims the priority benefit of China patent application no. 202011563209.0, filed on Dec. 25, 2020. The entirety of the above-mentioned patent application is hereby incorporated by reference herein and made a part of this specification.

BACKGROUND

Technical Field

The disclosure relates to a technical field of batteries, and in particular, relates to a battery module and a battery pack.

Description of Related Art

In an existing battery module, when batteries are to be stacked, structural glue is used most of the time to adhere and connect the batteries. Heat insulation pads are arranged between the batteries, and the metal end plates at both ends of the battery module and the metal side plates at both sides are welded to form a fixed frame of the module.

Nevertheless, since the side plates block the heat exchange channels between the batteries and the external environment through the side surface of the battery module, heat dissipation capacity of the batteries is significantly reduced.

In the case that thermal runaway occurs in one individual battery of the battery module, one part of heat is insulated through the heat insulation pads. Nevertheless, as the thermal conductivity coefficient of the metal side plates is large, the remaining part of heat generated by thermal runaway may be rapidly transferred to the batteries adjacent to the heat insulation pads through the side plates, thermal diffusion is thereby accelerated, and the battery module may eventually catch fire and explode.

SUMMARY

The disclosure provides a battery module.

According to one aspect of the disclosure, a battery module is provided, and the battery module includes a battery column, heat insulation pad, and a side plate. The battery column includes a plurality of batteries, and the batteries are arranged in a first direction. The heat insulation pad is disposed between two adjacent batteries in the battery column. The side plate is disposed on a side surface of the battery column and extends in the first direction. At least one heat-resistant region is disposed on the side plate and corresponds to a position of the heat insulation pad. The at least one heat-resistant region is any one of a through hole, a blind hole, and a notch or a combination of two or more of the foregoing communicated with each other. At least a portion of an orthographic projection of the heat insulation pad on the side plate is disposed within the heat-resistant region.

The disclosure further provides a battery pack.

According to one aspect of the disclosure, a battery pack is provided, and the battery pack includes the battery module provided by the disclosure.

To make the aforementioned more comprehensible, several embodiments accompanied with drawings are described in detail as follows.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances, proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
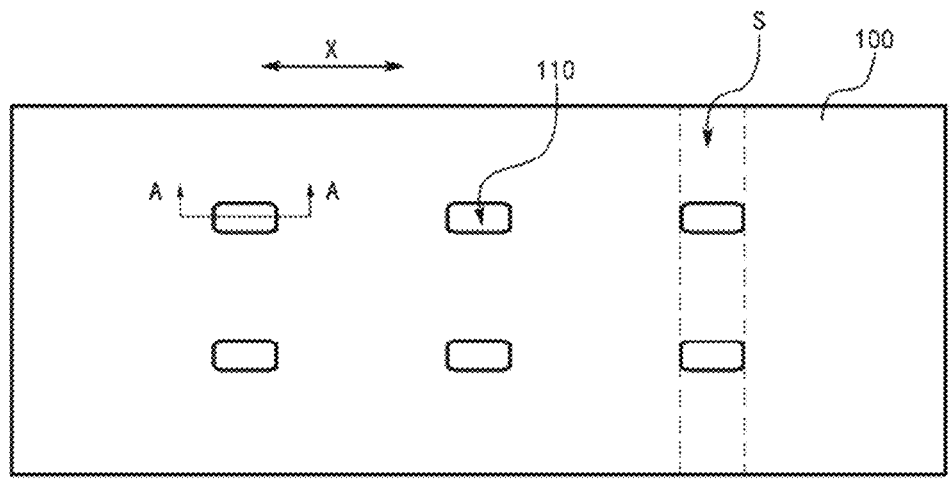
FIG. 1 is a schematic view of a structure of a side plate of a battery module according to an exemplary embodiment of the disclosure.

With reference to FIG. 1, a schematic view of a structure of a side plate of a battery module according to an embodiment of the disclosure is provided. In the exemplary embodiment, a square-shell battery module is used as an example of the battery module provided by the disclosure for description. It is easy for a person having ordinary skill in the art to understand that, in order to apply the relevant design of the disclosure to other types of battery modules, various modifications, additions, substitutions, deletions or other changes may be made to the following specific embodiments, and these changes are still fall within the scope of the principle of the battery module provided by the disclosure.

First Embodiment of Battery Module

Figure 2:
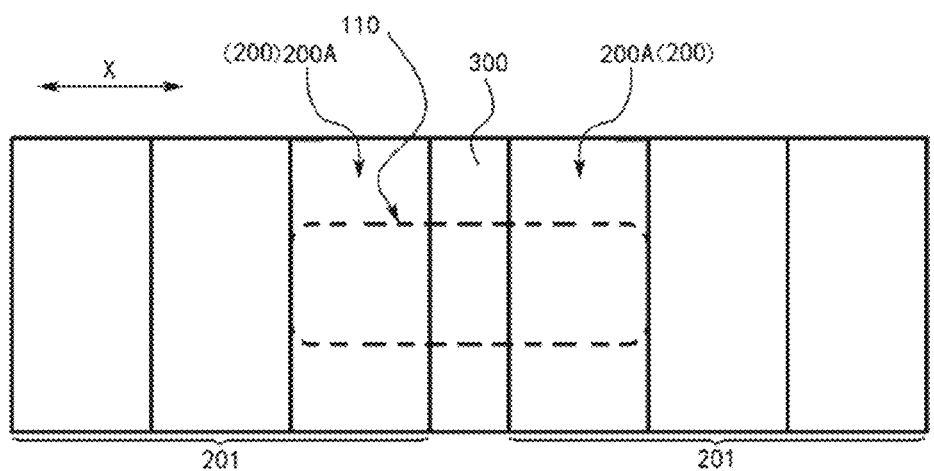
FIG. 2 is a schematic view illustrating a positional relationship among a heat-resistant region, batteries, and a heat insulation pad.
Figure 3:
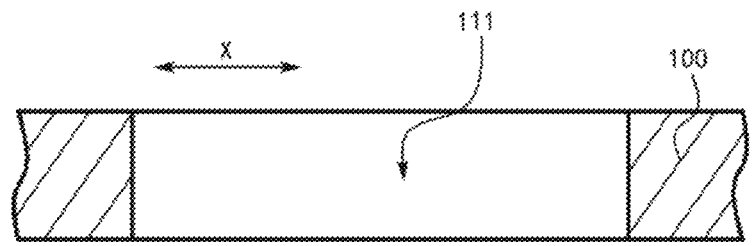
FIG. 3 is a cross-sectional view taken along a straight line A-A in FIG. 1.

As shown in FIG. 1, in this embodiment, a side plate 100 of a battery module provided by the disclosure may be disposed on a side surface of a plurality of batteries 200 arranged in a first direction X, and these batteries 200 are arranged into multiple columns in the first direction X. For ease of understanding and description, one column of the batteries 200 is defined as a battery column 201 in the specification. A heat insulation pad 300 is disposed between two adjacent battery columns 201, and the heat insulation pad 300 is actually disposed between two batteries 200 in the first direction X. With reference to FIG. 2 and FIG. 3, FIG. 2 is a schematic view illustrating a positional relationship among a heat-resistant region 110 of the side plate 100, the batteries 200, and the heat insulation pad 300, and FIG. 3 is a schematically cross-sectional view taken along a straight line A-A in FIG. 1. Hereinafter, a structure, a connection manner, and a functional relationship of main components of the side plate 100 of the battery module provided by the disclosure are described in detail together with the abovementioned drawings.

As shown in FIG. 1 to FIG. 3 and FIG. 14, in this embodiment, the side plate 100 is provided with the heat-resistant regions 110. Each of the heat-resistant regions 110 is a through hole 111, and the heat-resistant regions 110 correspond to positions of the heat insulation pads 300. A battery module 400 is provided with protection units. The protection units refer to the batteries 200 adjacent to the heat insulation pads 300 or the batteries 200 between the heat insulation pads 300 on two ends of the battery module 400 and end plates 410. When thermal runaway occurs in one battery 200 of one protection unit, the heat insulation pads 300 may block one part of heat generated by the battery 200 in the one protection unit caused by the thermal runaway to be transferred to the protection units adjacent to the heat insulation pads 300. Nevertheless, a part of the heat may still pass through the metal side plate 100 and may be rapidly transferred to the protection units adjacent to the heat insulation pads 300. As such, the heat-resistant regions 110 are disposed on positions of the side plate 100 corresponding to the heat insulation pads 300, and in this way, the part of heat generated by the battery 200 in one protection unit when thermal runaway occurs is prevented from being transferred to the protection units adjacent to the heat insulation pads 300. As such, according to a formula of heat transfer, $Q=K\Delta TA$, through arrangement of the through hole 111, a thermal conductivity coefficient K of the side plate of this path is 0, and a cross-sectional area A of heat transfer is 0. Therefore, 0 heat is transferred on this path, and heat transferred from one battery 200 to other batteries 200 adjacent to the heat insulation pads 300 may thus be decreased. Through the foregoing design, the side plate 100, when thermal runaway occurs in one individual battery 200, the side plate 100 of the battery module provided by the disclosure can reduce heat transfer among the batteries 200 adjacent to the heat insulation pads 300, thus thermal diffusion is suppressed.

Figure 14:
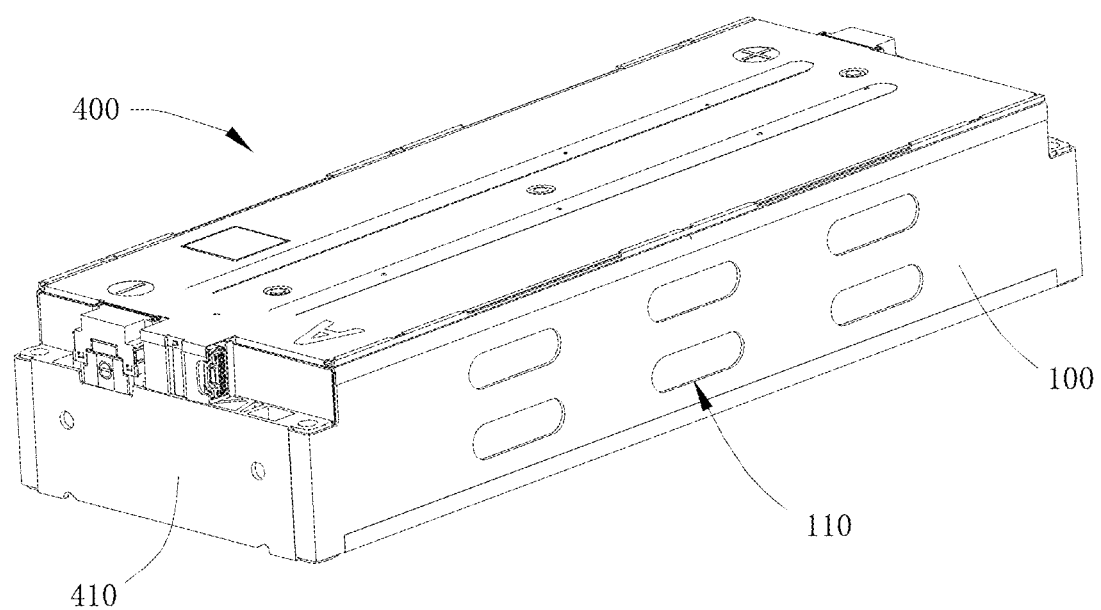
FIG. 14 is a schematic view of a structure of a battery module according to an exemplary embodiment of the disclosure.

As shown in FIG. 14, a schematic view of a structure of a battery module 400 implementing principles of the disclosure is provided. In this embodiment, the side plate 100 is disposed on a side surface of the battery module 400 provided by the disclosure.

Optionally, as shown in FIG. 1 and FIG. 2, in this embodiment, in the first direction X, an edge of an orthographic projection of the heat insulation pad 300 on the side plate 100 may not exceed an edge of the heat-resistant region 110. The above "not exceeding" design indicates that the edge of the orthographic projection of the heat insulation pad 300 on the side plate 100 is located inside the edge of the heat-resistant region 110, i.e., the form shown in this embodiment. That is, at least portions of the orthographic projections of two adjacent batteries 200 on the side plate 100 are both located within the heat-resistant region 110. In other embodiments, the above "not exceeding" design may also indicate that the edge of the orthographic projection of the heat insulation pad 300 on the side plate 100 is aligned with the edge of the heat-resistant region 110, and in this way, both the orthographic projections of adjacent two batteries 200 on the side plate 100 are not disposed within the heat-resistant region 110. Alternatively, the "not exceeding" design may further refer to that one edge of the orthographic projection of the heat insulation pad 300 on the side plate 100 is aligned with the edge of the heat-resistant region 110, and another edge of the orthographic projection of the heat insulation pad 300 is located inside the edge of the heat-resistant region 110, and in this way, the orthographic projection of each of the two adjacent batteries 200 on the side plate 100 is disposed within the heat-resistant region 110. Through the foregoing designs, it is ensured that when heat is transferred among the batteries 200 through the side plate 100, a uniform heat transfer effect may be achieved.

Further, as shown in FIG. 1 and FIG. 2, based on that the orthographic projection of the heat insulation pad 300 on the side plate 100 is designed not to exceed the edge of the heat-resistant region 110 in the first direction X, in this embodiment, at least one of two adjacent batteries 200 is defined as a target battery 200A, and at least a portion of an orthographic projection of the target battery 200A on the side plate 100 is disposed within the heat-resistant region 110.

Further, as shown in FIG. 1 and FIG. 2, based on that at least a portion of the orthographic projection of the target battery 200A on the side plate 100 is designed to be disposed within the heat-resistant region 110, in this embodiment, in the first direction X, the orthographic projection of the target battery 200A on the side plate 100 may not exceed the edge of the heat-resistant region 110. The above "not exceeding" design indicates that the edge of the orthographic projection of the target battery 200A on the side plate 100 is aligned with the edge of the heat-resistant region 110.

Further, as shown in FIG. 1 and FIG. 2, based on that the orthographic projection of the target battery 200A on the side plate 100 is designed not to exceed the edge of the heat-resistant region 110, in this embodiment, the two adjacent batteries 200 may both be the target batteries 200A. In other words, in the first direction X, two side edges of the heat-resistant region 110 are respectively aligned with opposite two side edges of the two target batteries 200A (i.e., two adjacent batteries 200). In this way, two side edges of the orthographic projection of the heat insulation pad 300 on the side plate 100 are both located inside the edges of the heat-resistant region 110. As such, through arrangement of the heat-resistant regions 110, heat transfer by the batteries 200 adjacent to the heat insulation pads 300 through the side plate 100 may be significantly decreased. Through the foregoing designs, it is ensured that when heat is transferred among the batteries 200 through the side plate 100, and uniform heat transfer effect may be achieved.

Figure 12:
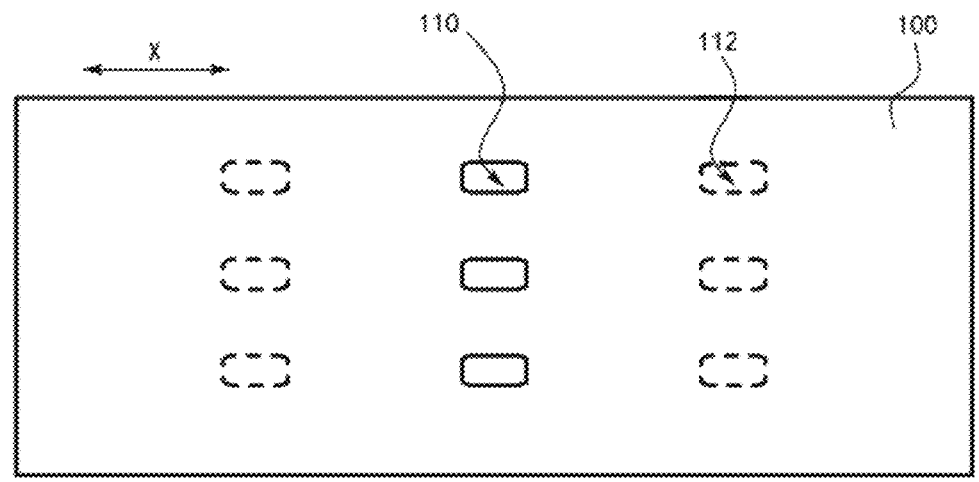
FIG. 12 is a schematic view of a structure of a side plate of a battery module according to still another exemplary embodiment of the disclosure.

Optionally, as shown in FIG. 1, FIG. 2, and FIG. 12, in this embodiment, an orthographic projection pattern of the heat-resistant region 110 on a surface of the side plate 100 may be a rectangle with four arc-shaped corners. A plane space may be more effectively used by a rectangle compared to other shapes such as a circle or a triangle. In addition, from the perspective of industrial mass production, a rectangular through hole 111 (or a blind hole 112) with four arc-shaped corners may be easily processed. In other embodiments, the orthographic projection pattern of the heat-resistant region 110 on the surface of the side plate 100 may be shaped as a rectangle, a circle, an ellipse, an oblong, or other shapes, which is not limited by the present embodiment.

Optionally, as shown in FIG. 1, in this embodiment, the side plate 100 may be provided with the heat-resistant regions 110 in groups. To be specific, corresponding to each heat insulation pad 300, the side plate 100 may be provided with one group of heat-resistant regions 110, and one group of heat-resistant regions 110 may include two or more heat-resistant regions 110. As such, heat transferred among the batteries 200 through the side plate 100 may be further decreased in the disclosure. In other embodiments, one group of heat-resistant regions 110 may also include one heat-resistant region 110 only. In other words, corresponding to any heat insulation pad 300, the side plate 100 may be provided with only one heat-resistant region 110, and the heat-resistant region 110 forms one group of its own, which is not limited by the present embodiment.

Further, as shown in FIG. 1, in this embodiment, numbers of the heat-resistant regions 110 in each group are equal. Moreover, the number of the heat-resistant regions 110 in each of the groups may be two. In other embodiments, the numbers of the heat-resistant regions 110 in each group may not be equal, and the numbers of the heat-resistant regions 110 in each group may be one, two, three, four, and so on, which is not limited by the present embodiment.

Further, as shown in FIG. 1, the two heat-resistant regions 110 in the same group may be arranged at intervals in a vertical direction. Herein, arrangement is made based on the side plate 100 in the vertical direction in the specification. In other words, the side surface of the battery module is taken as an example of a vertical plane for description in the specification, and positional changes (e.g., tilting and rotating) of the battery module in applications are not limited.

Further, when three or more heat-resistant regions 110 are included in one group, these heat-resistant regions 110 in the same group may be uniformly arranged at interval in the vertical direction.

Optionally, as shown in FIG. 1 and FIG. 2, in the present embodiment, a ratio of a sum of areas of the orthographic projection patterns of the heat-resistant regions 110 in the same group on the surface of the side plate 100 to an area of a reference region S on the surface of the side plate 100 may be less than or equal to $3/7$ (e.g., $1/5$, $1/4$, $1/3$, $3/8$, etc.). Herein, a height of the reference region S is a height of the side plate 100, and a width of the reference region S is a width of the heat-resistant region 110 in the first direction X. It is noted that, based on the design concept of the disclosure, under a condition that an overall structure of the side plate 100 is ensured to be implemented, the heat-resistant regions 110 having relatively large areas (i.e., larger area ratio of the heat-resistant regions 110 to the reference region S) can obtain better suppression to thermal diffusion. Certainly, since an excessive large area of the heat-resistant regions 110 may affect overall rigidity of the side plate 100, the side plate 100 may be connected to the batteries 200 through, for example, gluing, and when a gluing area increases, the rigidity increases.

Further, as shown in FIG. 1, in this embodiment, when both ends of the heat-resistant regions 110 in the same group are exemplified as being aligned in the vertical direction, the area ratio may also be understood as a sum of heights of all of the heat-resistant regions 110 in the same group to the height of the side plate 100. In other embodiments, the two ends of the heat-resistant regions 110 in the same group may also be arranged in an alternating manner, which is not limited by the present embodiment.

Optionally, as shown in FIG. 1 and FIG. 2, in the present embodiment, the battery module includes four battery columns 201. That is, the battery module includes three heat insulation pads 300. That is, the side plate 100 is provided with three heat-resistant regions 110, and positions of the three heat-resistant regions 110 respectively correspond to positions of the three heat insulation pads 300. Based on the above, the heat-resistant regions 110 belonging to different groups are independent from one another and do not communicate with one another. Accordingly, heat generated by thermal runaway may be rapidly transferred to other batteries 200, such that heat generated by thermal runaway may be uniformly transferred, and thermal runaway may thus be well-suppressed. In other words, in this embodiment, the battery module may include a plurality of heat insulation pads 300, and these heat insulation pads 300 may be respectively disposed on different positions of the battery columns 201 in the first direction X. Based on the above, a plurality of heat-resistant regions 110 (or plural groups of heat-resistant regions 110) may be disposed on the side plate 100. One heat insulation pad 300 at least corresponds to one of the heat-resistant regions 110, and the heat-resistant regions 110 corresponding to different heat insulation pad 300 do not communicate with one another. In other embodiments, the battery module may include only one battery column 201. The heat insulation pads 300 may be disposed between any two adjacent batteries 200 in such battery column 201, and heat-resistant regions 110 may be correspondingly disposed on the side plate 110. Further, in the case that the battery module includes a plurality of battery columns 201, each of the battery columns 201 may include one battery only, which is not limited by the embodiment.

Second Embodiment of Battery Module

Figure 4:
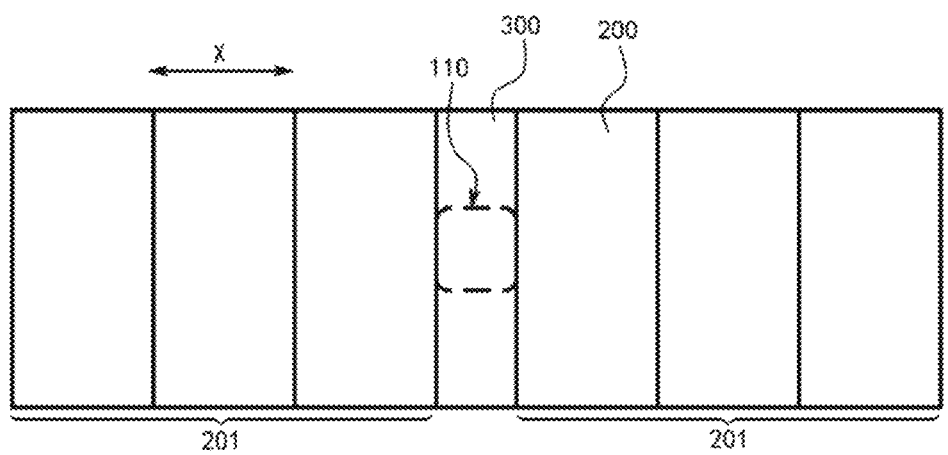
FIG. 4 is a schematic view of the positional relationship among a heat-resistant region of a side plate, batteries, and a heat insulation pad in a battery module according to another exemplary embodiment of the disclosure.

With reference to FIG. 4, which represents a schematic view of the structure of the side plate 100 of the battery module according to another exemplary embodiment of the disclosure and specifically illustrates the positional relationship among the heat-resistant region 110 of the side plate 100, the batteries 200, and the heat insulation pad 300.

As shown in FIG. 4, in this embodiment, in the first direction, the edge of the heat insulation pad 300 may be aligned with the edge of the heat-resistant region 110. As such, heat generated by thermal runaway may be rapidly transferred to other batteries 200. In other embodiments, the heat-resistant region 110 may merely cover a portion of a side surface of the heat insulation pad 300, which is not limited by the present embodiment.

Third Embodiment of Battery Module

Figure 5:
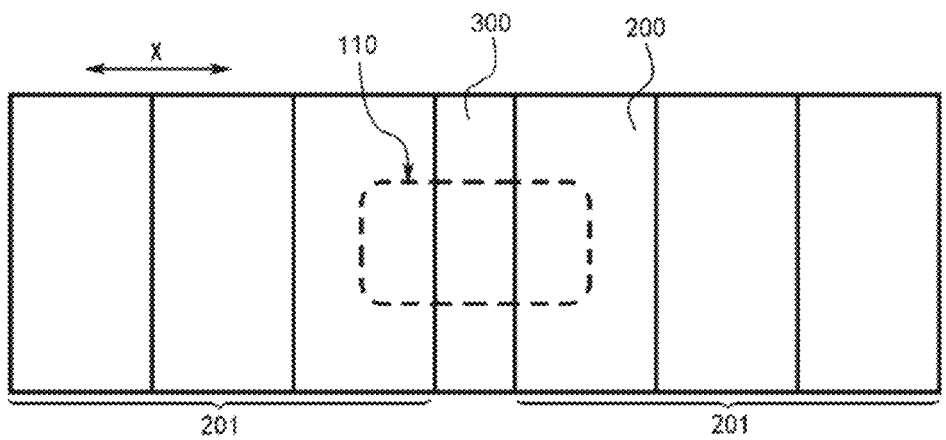
FIG. 5 is a schematic view of the positional relationship among a heat-resistant region of a side plate, the batteries, and a heat insulation pad in a battery module according to still another exemplary embodiment of the disclosure.

With reference to FIG. 5, which represents a schematic view of the structure of the side plate 100 of the battery module according to another exemplary embodiment of the disclosure and specifically illustrates the positional relationship among the heat-resistant region 110 of the side plate 100, the batteries 200, and the heat insulation pad 300.

As shown in FIG. 5, in this embodiment, in the first direction X, the edge of the heat insulation pad 300 may be located at an inner side of the edge of the heat-resistant region 110, and edges of opposite sides of two adjacent batteries 200 may be located at an outer side of the edge of the heat-resistant region 110. In this way, thermal runaway may be suppressed.

Fourth Embodiment of Battery Module

Figure 6:
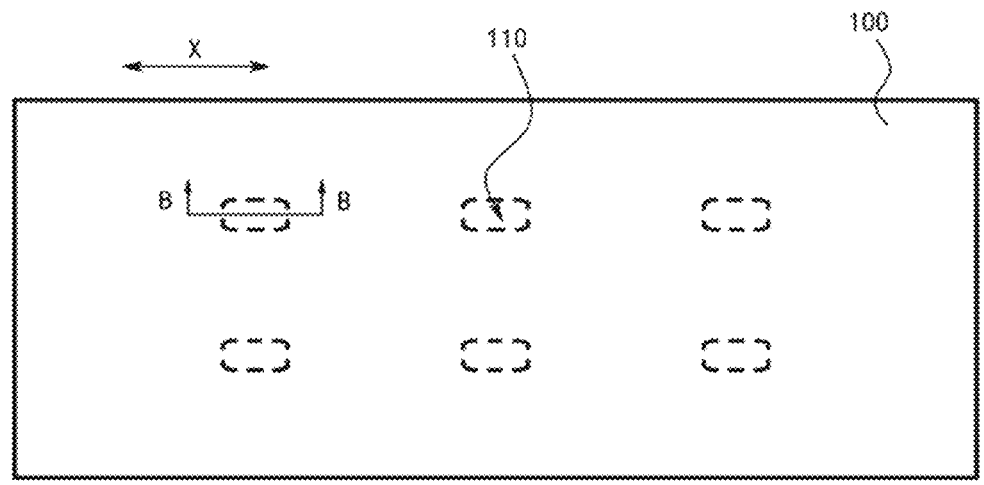
FIG. 6 is a schematic view of a structure of a side plate of a battery module according to another exemplary embodiment of the disclosure.
Figure 7:
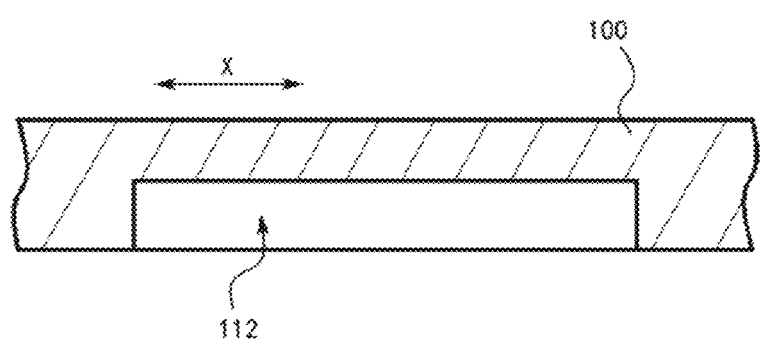
FIG. 7 is a cross-sectional view taken along a straight line B-B in FIG. 6.

With reference to FIG. 6 and FIG. 7, which represent schematic views of the structure of the side plate 100 of the battery module according to another exemplary embodiment of the disclosure. FIG. 6 specifically illustrates the structure of the side plate 100, and FIG. 7 specifically illustrates a cross-sectional structure taken along a straight line B-B in FIG. 6.

As shown in FIG. 6 and FIG. 7, in this embodiment, each of the heat-resistant regions 110 may be the blind hole 12, and the blind hole 112 may be arranged facing the battery column 201. That is, the blind hole 201 may be disposed on a side surface (i.e., an inner surface) of the side plate 100 facing the battery column 201. In other words, an opening of the blind hole 112 is located on the inner surface of the side plate 100. As such, in the disclosure, a contact area between the side plate 100 and one battery 200 may be reduced, by virtue of the position of the opening of the blind hole 112, and heat transferred through the side plate 100 is thereby decreased. Moreover, normal heat transfer may also be achieved through the structure of the side plate 100 at a closed end of the blind hole 112.

Further, in this embodiment, a ratio of a depth of the blind hole 112 to a thickness of the side plate 100 may be ⅕ to ⅘ (e.g., ⅕, ¼, ⅝, ⅘, etc.).

Fifth Embodiment of Battery Module

Figure 8:
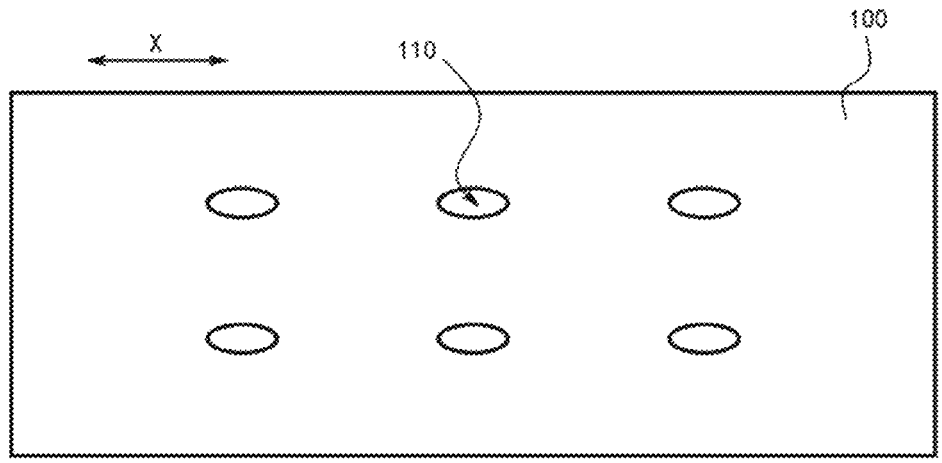
FIG. 8 is a schematic view of a structure of a side plate of a battery module according to another exemplary embodiment of the disclosure.

With reference to FIG. 8, which represents a schematic view of the structure of the side plate 100 of the battery module according to another exemplary embodiment of the disclosure and specifically illustrates the structure and arrangement of the heat-resistant regions on the side plate 100.

As shown in FIG. 2 and FIG. 8, in this embodiment, the orthographic projection pattern of each of the heat-resistant regions 110 on the surface of the side plate 100 is an ellipse. A major axis direction of the ellipse is a horizontal direction, that is, a length direction of the side plate 100, that is, the first direction X of the batteries 200. A minor axis direction of the ellipse is the vertical direction, that is, a height direction of the side plate 100. In other embodiments, in the case that the orthographic projection pattern of each of the heat-resistant regions 110 on the surface of the side plate 100 is an ellipse, the major axis direction of the ellipse may also be the vertical direction, or an included angle may be provided between the major axis direction and the horizontal direction. In addition, when a major axis of an ellipse is equal to a minor axis, such shape is a circle.

Sixth Embodiment of Battery Module

Figure 9:
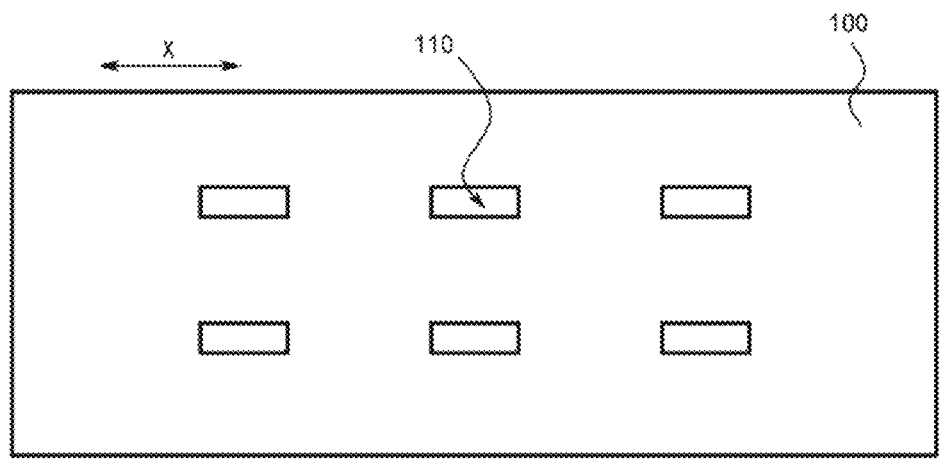
FIG. 9 is a schematic view of a structure of a side plate of a battery module according to still another exemplary embodiment of the disclosure.

With reference to FIG. 9, which represents a schematic view of the structure of the side plate 100 of the battery module according to another exemplary embodiment of the disclosure, and specifically illustrates the structure and arrangement of the heat-resistant regions on the side plate 100.

As shown in FIG. 2 and FIG. 9, in this embodiment, the orthographic projection pattern of each of the heat-resistant regions 110 on the surface of the side plate 100 is a rectangle, and such rectangle may specifically be an oblong. A long side direction of the rectangle is the horizontal direction, that is, the length direction of the side plate 100, that is, the first direction X of the batteries 200. A short side direction of the rectangle is the vertical direction, that is, the height direction of the side plate 100. In other embodiments, in the case that the orthographic projection pattern of each of the heat-resistant regions 110 on the surface of the side plate 100 is a rectangle, the long side direction of the rectangle may also be the vertical direction, or an included angle may be provided between the long side direction and the horizontal direction. In addition, when a long side of a rectangle is equal to a short side, such shape is a square.

Seventh Embodiment of Battery Module

Figure 10:
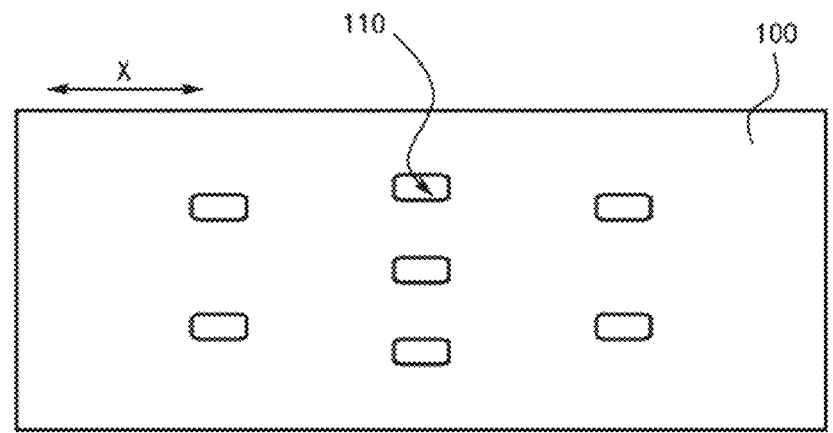
FIG. 10 is a schematic view of a structure of a side plate of a battery module according to still another exemplary embodiment of the disclosure.

With reference to FIG. 10, which represents a schematic view of the structure of the side plate 100 of the battery module according to another exemplary embodiment of the disclosure and specifically illustrates the structure and arrangement of the heat-resistant regions on the side plate 100.

As shown in FIG. 10, in this embodiment, three groups of the heat-resistant regions 110 are disposed on the side plate 100, and the numbers of the heat-resistant regions 110 included in each group of the heat-resistant regions 110 are not completely the same. In other embodiments, the numbers of each group of the heat-resistant regions 110 may be completely the same or may be completely different.

Further, as shown in FIG. 2 and FIG. 10, in this embodiment, in the first direction X, the group relatively located at the center has three heat-resistant regions 110, and each of the groups relatively located at two sides has two heat-resistant regions 110. In other words, the plural groups of the heat-resistant regions 110 provided on the side plate 100 respectively correspond to plural heat insulation pads 300. In the first direction X, for any two heat insulation pads 300, the number of the heat-resistant regions 110 corresponding to the heat insulation pad 300 closer to one end of the battery module may be less than the number of the heat-resistant regions 110 corresponding to the heat insulation pad 300 away from two ends (that is, centrally located relatively) of the battery module. As such, the heat transfer feature provided by the disclosure may be further adapted to stacking of plural battery columns 201.

Eighth Embodiment of Battery Module

Figure 11:
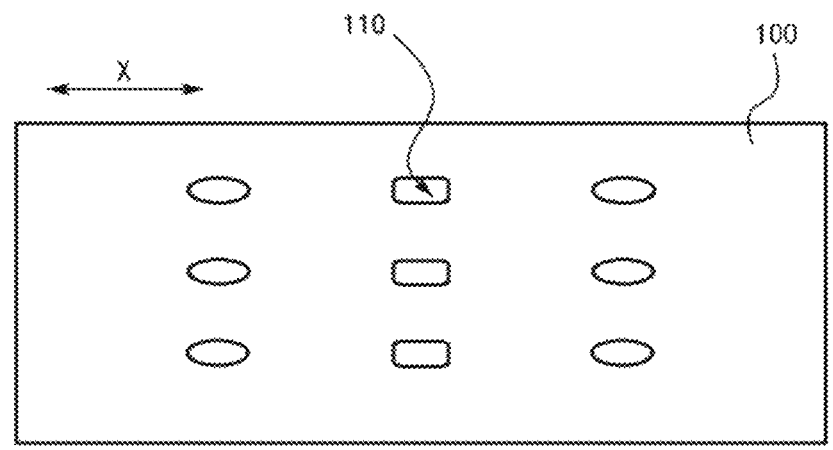
FIG. 11 is a schematic view of a structure of a side plate of a battery module according to still another exemplary embodiment of the disclosure.

With reference to FIG. 11, which represents a schematic view of the structure of the side plate 100 of the battery module according to another exemplary embodiment of the disclosure and specifically illustrates the structure and arrangement of the heat-resistant regions on the side plate 100.

As shown in FIG. 11, in this embodiment, three groups of the heat-resistant regions 110 are disposed on the side plate 100. The orthographic projection pattern of the heat-resistant regions 110 belonging to one of the groups on the surface of the side plate 100 is a rectangle, and the orthographic projection pattern of the heat-resistant regions 110 belonging to the remaining two groups on the surface of the side plate 100 is an ellipse. In other embodiment, the orthographic projection patterns of the heat-resistant regions 110 in each group may be completely the same, may be partially the same and partially different, or may be completely different. Further, for a plurality of groups of the heat-resistant regions 110, the orthographic projection patterns of the heat-resistant regions 110 among the individual groups may be the same or may be different. For a plurality of heat-resistant regions 110 belonging to the same group, the orthographic projection patterns of the plural heat-resistant regions 110 may be the same or may be different, which is not limited by the present embodiment.

Ninth Embodiment of Battery Module

With reference to FIG. 12, which represents a schematic view of the structure of the side plate 100 of the battery module according to another exemplary embodiment of the disclosure and specifically illustrates the structure and arrangement of the heat-resistant regions on the side plate 100.

As shown in FIG. 12, in this embodiment, three groups of the heat-resistant regions 110 are disposed on the side plate 100, the heat-resistant regions 110 in one of the groups is through hole 111, and the heat-resistant regions 110 in the remaining two groups is the blind hole 112. In other embodiments, the heat-resistant regions 110 of each group may be the through hole 111 or may be the blind hole 112.

Further, as shown in FIG. 12, in this embodiment, in the first direction X, each of the heat-resistant regions 110 of one group centrally located relatively is the through hole 111, and each of the heat-resistant regions 110 of the two groups relatively located at two sides is the blind hole 112. In other words, the plural groups of the heat-resistant regions 110 provided on the side plate 100 correspond to plural heat insulation pads 300. In the first direction X, for any two heat insulation pads 300, the heat-resistant regions 110 corresponding to the heat insulation pad 300 closer to one end of the battery module may be the blind holes 112 and may also be the through holes 111, and the heat-resistant regions 110 corresponding to the heat insulation pad 300 away from two ends (that is, centrally located relatively) of the battery module may be the through holes 111 and may also be the blind holes 112. As such, the heat transfer feature provided by the disclosure may be further adapted to arrangement of plural battery columns 201.

Tenth Embodiment of Battery Module

Figure 13:
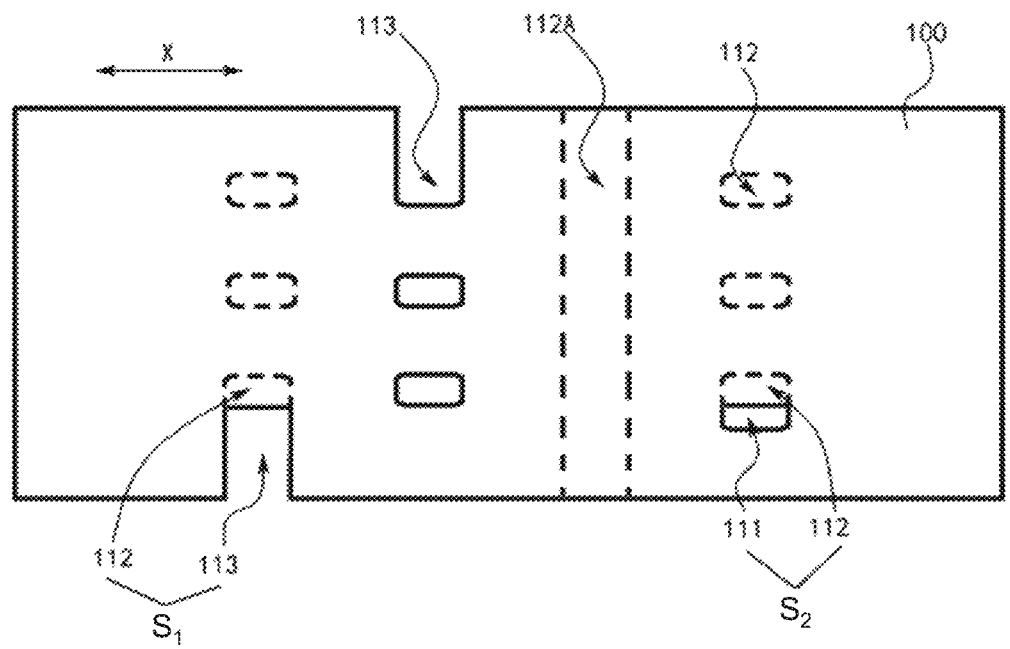
FIG. 13 is a schematic view of a structure of a side plate of a battery module according to still another exemplary embodiment of the disclosure.

With reference to FIG. 13, which represents a schematic view of the structure of the side plate 100 of the battery module according to another exemplary embodiment of the disclosure and specifically illustrates the structure and arrangement of the heat-resistant regions on the side plate 100.

As shown in FIG. 13, in this embodiment, plural groups of the heat-resistant regions 110 of a plurality of types are disposed on the side plate 100. For instance, the heat-resistant region 110 may be a notch 113. An opening of the notch 113 is located at one side of the side plate 100. Further, the notch 113 may also be treated as a combination structure of the through hole 111 and the notch 113 communicated with each other. With reference to a heat-resistant region $S_2$, it can be seen that a heat-resistant region 110 may also be a combination of the through hole 111 and the blind hole 112. The through hole 111 and the blind hole 112 of the heat-resistant region $S_2$ are communicated with each other on the inner surface of the side plate 100. With reference to a heat-resistant region $S_1$, it can be seen that a heat-resistant region 110 may also be a combination of the blind hole 112 and the notch 113. The notch 113 and the blind hole 112 of the heat-resistant region $S_1$ are communicated with each other on the inner surface of the side plate 100. In addition, with reference to a blind hole 112A, in the case that the heat-resistant regions 110 are the blind hole 112, openings may be provided on two sides (or one side) of the side plate 100. In other embodiments, one heat-resistant region 110 may also be a combination of the through hole 111, the blind hole 112, and the notch 113 communicated with one another.

As described above, in the various embodiments conforming to the design concept of the disclosure, each of the heat-resistant regions 110 disposed on the side plate 100 may be any one of the through hole 111, the blind hole 112, and the notch 113, may be a combination of any two of the foregoing three, and may also be a combination of the foregoing three.

Note that the battery module examples shown in the drawings and described in the specification are only a few examples of many types of battery modules that may adopt the principles of the disclosure. It should be clearly understood that the principles of the disclosure are by no means limited to any details or any components of the battery module shown in the drawings or described in the specification.

In view of the foregoing, in the battery module provided by the disclosure, the heat-resistant regions are disposed on the positions corresponding to the heat insulation pads on the side plate, and each of the heat-resistant regions may be any one of the through hole, the blind hole, and the notch, may be a combination of any two of the foregoing three, or may also be a combination of the foregoing three. In this way, in the case that the side plate is disposed on the side surface of the battery module, through arrangement of the heat-resistant regions, the cross-sectional area of heat transferred through the side plate is reduced, and that heat transferred from the batteries to the batteries adjacent to the heat insulation pads through the side plate may be decreased. Through the foregoing design, in the battery module provided by the disclosure, if thermal runaway occurs in one individual battery, since heat transferred between the batteries adjacent to the heat insulation pads is decreased, thermal diffusion is suppressed.

Based on the above detailed description of the exemplary embodiments of the battery module provided by the disclosure, an exemplary embodiment of a battery pack provided by the disclosure is described below with reference to FIGS. 15 and 16.

Embodiment of Battery Pack

Figure 15:
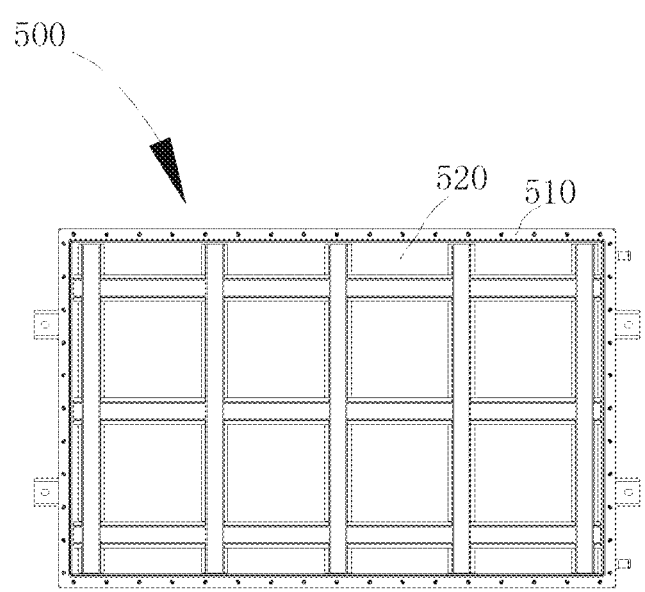
FIG. 15 is a top view of a battery pack according to an exemplary embodiment of the disclosure.

As shown in FIG. 15, a top view illustrating a battery pack 500 implementing the principles of the disclosure is provided. With reference to FIG. 16 together, a top view of a portion of a structure of the battery pack 500 shown in FIG. 15 is provided, and the structure provided herein is specifically a structure after a box cover 520 is removed.

Figure 16:
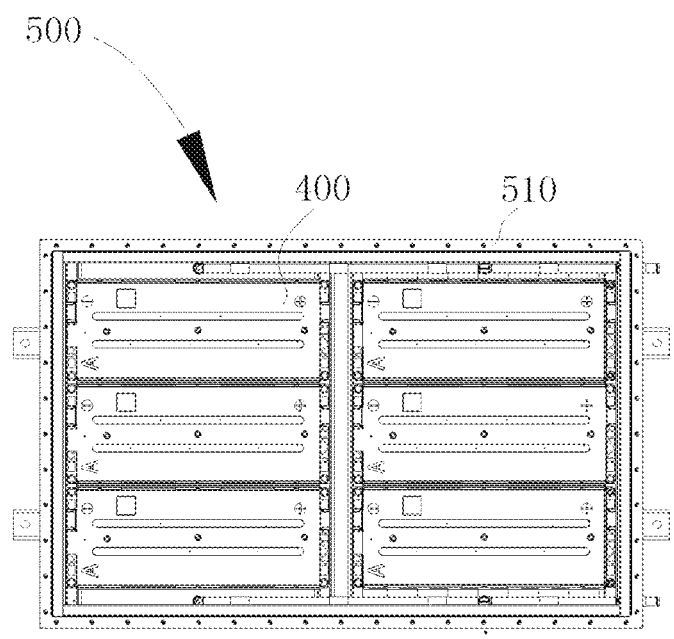
FIG. 16 is a top view of a portion of a structure of the battery pack shown in FIG. 15.

As shown in FIG. 15 and FIG. 16, in this embodiment, the battery pack 500 provided by the disclosure includes a box body 510, the box cover 520, and the battery module 400 described in detail in the foregoing embodiments of the disclosure. Herein, the battery module 400 is disposed in the box body 510, and the box cover 520 may close a top portion of the box body 510. Through the foregoing design, in the battery pack 500 provided by the disclosure, if thermal runaway occurs in one individual battery of the battery module 400, thermal diffusion may be suppressed, and the battery module is prevented from catching fire and exploding. It is noted that, FIG. 16 merely schematically illustrates a number and an arrangement manner of the battery module 400 in the battery pack 500. It should be understood that in the various embodiments conforming to the design concept of the disclosure, the number and the arrangement manner of the battery module 400 included in the battery pack 500 may be flexibly selected and are not limited by the present embodiment.

Note that the battery pack examples shown in the drawings and described in the specification are only a few examples of many types of battery packs that may adopt the principles of the disclosure. It should be clearly understood that the principles of the disclosure are by no means limited to any details or any components of the battery pack shown in the drawings or described in the specification.

In view of the foregoing, in the battery pack provided by the disclosure, through the arrangement of the battery module provided by the disclosure, the cross-sectional area of heat transferred through the side plate is reduced thanks to the arrangement of the heat-resistant regions on the side plate of the battery module, and that heat transferred from the batteries to other batteries adjacent to the heat insulation pads through the side plate may be decreased. Through the foregoing design, in the battery pack provided by the disclosure, if thermal runaway occurs in one individual battery, thermal diffusion may be suppressed, and the battery module is prevented from catching fire and exploding.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery module, comprising:
a battery column, including a plurality of batteries, wherein the batteries are arranged in a first direction;
a heat insulation pad, disposed between two adjacent batteries in the battery column;
a side plate, disposed on a side surface of the battery column and extending in the first direction;
wherein at least one heat-resistant region is disposed on the side plate and corresponds to a position of the heat insulation pad, the heat-resistant region is any one of a through hole, a blind hole, and a notch or a combination of two or more of the foregoing communicated with each other, and at least a portion of the at insulation pad overlaps the heat-resistant region of the side plate,
wherein the heat-resistant region covers a portion of a side surface of the heat insulation pad, at least one of the two adjacent batteries is a target battery, and at least a portion of an orthographic projection of the target battery on the side plate is disposed within the heat-resistant region, and the side surface of the heat insulation pad faces an inner surface of the side plate.

2. The battery module according to claim 1, wherein an orthographic projection of the heat insulation pad on the side plate in the first direction does not exceed an edge of the heat-resistant region.

3. The battery module according to claim 2, wherein a plurality of the heat insulation pads are provided and are respectively disposed on different positions of the battery column in the first direction,
a plurality of the heat-resistant regions are disposed on the side plate, one of the heat insulation pads at least corresponds to one of the heat-resistant regions, and the heat-resistant regions corresponding to different heat insulation pads do not communicate with one another.

4. The battery module according to claim 2, wherein a ratio of a sum of areas of orthographic projection patterns of all heat-resistant regions of the at least one heat-resistant region corresponding to the heat insulation pad on the side plate to an area of a reference region is less than or equal to $3/7$, the reference region is rectangular, a height of the reference region is a height of the side plate, and a width of the reference region is an average length of all the heat-resistant regions in the first direction.

5. The battery module according to claim 1, wherein the orthographic projection of the target battery on the side plate in the first direction does not exceed the edge of the heat-resistant region.

6. The battery module according to claim 5, wherein the two adjacent batteries are both target batteries.

7. The battery module according to claim 6, wherein a plurality of heat insulation pads are provided and are respectively disposed on different positions of the battery column in the first direction,
a plurality of the heat-resistant regions are disposed on the side plate, one of the heat insulation pads at least corresponds to one of the heat-resistant regions, and the heat-resistant regions corresponding to different heat insulation pads do not communicate with one another.

8. The battery module according to claim 6, wherein a ratio of a sum of areas of orthographic projection patterns of all heat-resistant regions of the at least one heat-resistant region corresponding to the heat insulation pad on the side plate to an area of a reference region is less than or equal to 3/7, the reference region is rectangular, a height of the reference region is a height of the side plate, and a width of the reference region is an average length of all the heat-resistant regions in the first direction.

9. The battery module according to claim 5, wherein a plurality of the heat insulation pads are provided and are respectively disposed on different positions of the battery column in the first direction,
a plurality of the heat-resistant regions are disposed on the side plate, one of the heat insulation pads at least corresponds to one of the heat-resistant regions, and the heat-resistant regions corresponding to different heat insulation pads do not communicate with one another.

10. The battery module according to claim 5, wherein a ratio of a sum of areas of orthographic projection patterns of all heat-resistant regions of the at least one heat-resistant region corresponding to the heat insulation pad on the side plate to an area of a reference region is less than or equal to 3/7, the reference region is rectangular, a height of the reference region is a height of the side plate, and a width of the reference region is an average length of all the heat-resistant regions in the first direction.

11. The battery module according to claim 1, wherein an opening of the blind hole faces the battery column.

12. The battery module according to claim 11, wherein a plurality of the heat insulation pads are provided and are respectively disposed on different positions of the battery column in the first direction,
a plurality of the heat-resistant regions are disposed on the side plate, one of the heat insulation pads at least corresponds to one of the heat-resistant regions, and the heat-resistant regions corresponding to different heat insulation pads do not communicate with one another.

13. The battery module according to claim 1, wherein a plurality of the heat insulation pads are provided and are respectively disposed on different positions of the battery column in the first direction,
a plurality of the heat-resistant regions are disposed on the side plate, one of the heat insulation pads at least corresponds to one of the heat-resistant regions, and the heat-resistant regions corresponding to different heat insulation pads do not communicate with one another.

14. The battery module according to claim 1, wherein a ratio of a sum of areas of orthographic projection patterns of all heat-resistant regions of the at least one heat-resistant region corresponding to the heat insulation pad on the side plate to an area of a reference region is less than or equal to 3/7, the reference region is rectangular, a height of the reference region is a height of the side plate, and a width of the reference region is an average length of all the heat-resistant regions in the first direction.

15. A battery pack, comprising the battery module according to claim 1.

16. A battery pack, comprising the battery module according to claim 2.

* * * * *